United States Patent [19]

Hedrick

[11] Patent Number: 5,172,760

[45] Date of Patent: Dec. 22, 1992

[54] HEAT EXCHANGE APPARATUS FOR SEPARATING A RESIN PHASE FROM A SOLVENT SOLUTION CONTAINING A SOLVENT, DEMETALLIZED OIL AND A RESIN

[75] Inventor: Brian W. Hedrick, Rolling Meadows, Ill.

[73] Assignee: UOP, Des Plaines, Ill.

[21] Appl. No.: 776,037

[22] Filed: Oct. 15, 1991

Related U.S. Application Data

[62] Division of Ser. No. 632,700, Dec. 24, 1990, Pat. No. 5,098,994.

[51] Int. Cl.⁵ ............................................. F28F 9/22
[52] U.S. Cl. ................................. 165/114; 165/111; 165/160; 208/45; 528/503
[58] Field of Search ................... 165/111, 114, 160; 208/45; 528/503

[56] References Cited

U.S. PATENT DOCUMENTS 2,661,190 12/1953 Kirkpatrick .......................... 165/111
4,706,742 11/1987 Ganzer ................................ 165/160

*Primary Examiner*—Albert W. Davis, Jr.
*Attorney, Agent, or Firm*—Thomas K. McBride; John G. Tolomei; John G. Cutts, Jr.

[57] ABSTRACT

A heat-exchange apparatus for separating a resin phase from a solvent solution containing a solvent, demetallized oil and resin which comprises: (a) at least one generally vertically positioned heat-exchange surface; (b) a means for directing the flow of the solvent solution in a downward direction over a portion of the heat-exchange surface thereby heating the solvent solution to precipitate a resin phase; (c) an outlet means to recover a solvent solution having a reduced concentration of resin which outlet means is located to essentially reverse the flow of the solvent solution having a reduced concentration of resin to a generally upward direction before exiting the heat-exchange apparatus; and (d) an outlet means to recover the resin phase from a lower portion of the heat-exchange apparatus.

5 Claims, 1 Drawing Sheet

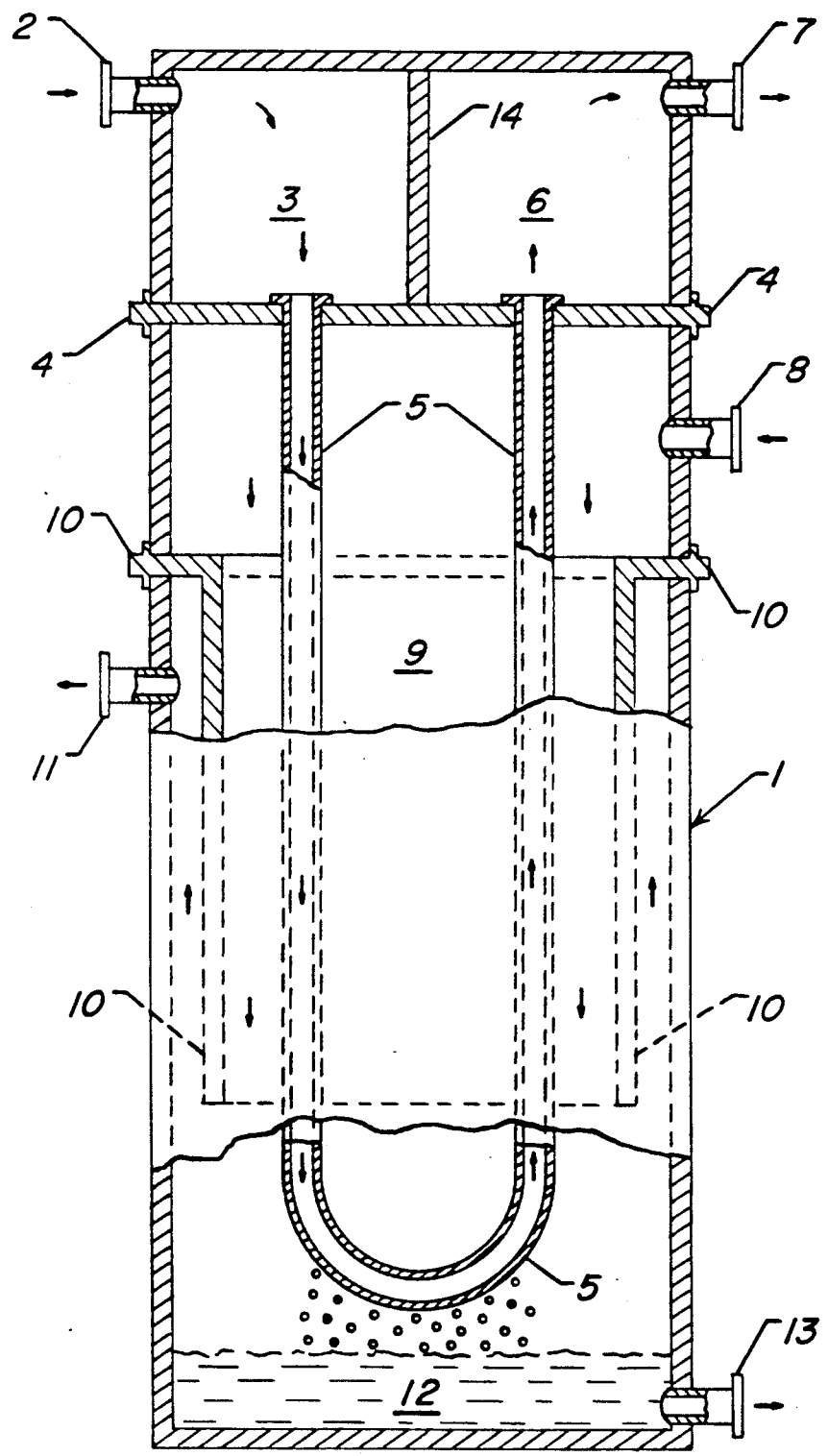

HEAT EXCHANGE APPARATUS FOR SEPARATING A RESIN PHASE FROM A SOLVENT SOLUTION CONTAINING A SOLVENT, DEMETALLIZED OIL AND A RESIN

CROSS REFERENCE TO RELATED APPLICATION

This application is a division of application Ser. No. 632,700 filed Dec. 24, 1990, now U.S. Pat. No. 5,098,994, issued Mar. 24, 1992, all the teachings of which co-pending application are incorporated herein by specific reference thereto.

BACKGROUND OF THE INVENTION

The field of art to which this invention pertains is the removal of hydrocarbon-insoluble asphaltenic material and carbometallic compounds from hydrocarbonaceous charge stocks containing these undesirable contaminants. More specifically, the invention is directed toward a heat-exchange apparatus for deasphalting and demetallizing atmospheric tower bottoms, vacuum tower bottoms (vacuum residuum), crude oil residuum, topped crude oils, coal oil extract, shale oils, all of which generally contain varying quantities of asphaltenic material and carbometallic compounds. Even more specifically, the invention relates to a heat-exchange apparatus for separating a resin phase from a solvent solution containing a solvent, demetallized oil and resin. Such a solvent solution is usually generated during the overall process of deasphalting and demetallizing a heavy residual hydrocarbonaceous feed stream.

INFORMATION DISCLOSURE

The prior art proliferates in a wide spectrum of deasphalting and demetallizing processes for the removal of hydrocarbon-insoluble asphaltenic material and carbometabolic compounds from a heavy residual hydrocarbon feed stream. The prior art also contains a plethora of heat-exchange apparatus. The applicant is not aware of any known prior art which either teaches or suggests the present invention.

BRIEF SUMMARY OF THE INVENTION

The invention provides an improved process and heat-exchange apparatus for separating a resin phase from a solvent solution containing a solvent, demetallized oil and resin by means of directing the flow of the solvent solution in a downward direction over a portion of a generally vertically positioned heat exchange surface thereby heating the solvent solution to precipitate a resin phase, reversing the flow of the resulting solvent solution having a reduced concentration of resins to a generally upward direction, recovering the solvent solution having a reduced concentration of resin and also recovering the resin phase which was produced. Important advantages of the improved process and heat-exchange apparatus are the enhanced ability to readily produce a new liquid phase by means of a temperature change within a heat exchanger having certain novel design characteristics and the ability to take advantage of resin forming a separate phase on the hot surface of the heat exchanger then permitting the resin to flow down the heat exchanged surface to a low velocity, continuous phase region of the vessel before dripping from the bottoms of the heat exchanged surfaces, by separating at least some of the entrained resins by the sudden reversal of the continuous phase flow direction.

One embodiment of the invention may be characterized as a heat-exchange apparatus for separating a resin phase from a solvent solution containing a solvent, demetallized oil and resin which comprises: (a) at least one generally vertically positioned heat-exchange surface; (b) a means for directing the flow of said solvent solution in a downward direction over a portion of said heat-exchange surface thereby heating said solvent solution to precipitate a resin phase; (c) an outlet means to recover a solvent solution having a reduced concentration of resin which outlet means is located to essentially reverse the flow of said solvent solution having a reduced concentration of resin to a generally upward direction before exiting said heat-exchange apparatus; and (d) an outlet means to recover said resin phase from a lower portion of said heat-exchange apparatus.

Other embodiments of the present invention encompass further details such as preferred feedstocks and operating conditions, all of which are hereinafter disclosed in the following discussion of each of these facets of the invention.

BRIEF DESCRIPTION OF THE DRAWING

The drawing is a vertical cross-section of a preferred embodiment of the present invention.

DESCRIPTION OF THE DRAWING

As illustrated in the drawing, the apparatus of the present invention comprises heat exchange vessel 1 having a hot heat exchange fluid inlet 2 whereby hot heat exchange fluid is introduced into manifold 3 which directs the hot heat exchange fluid into a generally vertically oriented heat exchange tube 5. The heat exchange fluid exits heat exchange tube 5 and enters into manifold 6 and is subsequently removed from heat exchange vessel 1 via cold heat exchange fluid outlet 7. Barrier 14 is utilized to separate manifold 3 from manifold 6 which ensures that the flowing heat exchange fluid is conducted through heat exchange tube 5. Tube sheet 4 is utilized in a conventional manner to serve as a partition and to support heat exchange tube 5. Cold solvent solution inlet 8 is located near the upper end of heat exchange zone 9 and is used to introduce a cold solvent solution containing demetallized oil and resin. Baffle 10 is utilized to initially direct the flow of the cold solvent solution in a generally downward direction while contacting heat exchange tube 5 to thereby heat the flowing cold solvent solution which precipitates a resin phase. The resulting heated solvent solution having a reduced concentration of resin is reversed by means of baffle 10 to a generally upward flowing direction and exits heat exchange zone 9 via hot solvent solution outlet 11. The resin phase which is precipitated from the flowing solvent solution is collected in the bottom of heat exchange zone 9 in a resin phase 12. The resulting resin phase is removed from heat exchange vessel 1 via resin phase outlet 13.

DETAILED DESCRIPTION OF THE INVENTION

When the chronological history of the art of solvent deasphalting is traced, it becomes apparent that those having the requisite expertise recognize the benefits of separating a resin phase from a solvent solution containing a solvent, demetallized oil and resin which solvent solution is derived from a low value residual feedstock.

The present invention provides an improved process and heat-exchange apparatus for the production and separation of a resin phase from a solvent solution containing a solvent, demetallized oil and resin.

In accordance with the present invention, suitable residual feedstocks which may be used to prepare the solvent solution utilized in the present invention include, for example, atmospheric tower bottoms, vacuum tower bottoms, crude oil, topped crude oils, coal oil extract, shale oils, and oils recovered from tar sands.

The solvent solution which is used as the feed to the present invention is prepared by countercurrently contacting a residual feed stream with a hydrocarbon-selective solvent, in a solvent extraction zone, at extraction conditions selected to produce a solvent-lean asphaltic stream and a solvent-rich hydrocarbon stream containing demetallized oil and resin. The solvent extraction zone will preferably function at temperatures of about 50° F. to about 600° F.; the pressure will be maintained within the range of about 100 to about 1,000 psig. The solvent/residual oil volumetric ratio will be in the range of about 2:1 to about 30:1. Judicious procedures involve the selection of temperature and pressure to maintain the extraction operations in liquid phase.

Suitable solvents include those utilized by the prior art deasphalting techniques and it is contemplated that the solvent will be selected from the group of light hydrocarbons including ethane, propane, butane, isobutane, pentane, isopentane, neopentane, hexane, isohexane, heptane, and the mono-olefinic counterparts thereof. Furthermore, the solvent may be a normally liquid naphtha fraction containing hydrocarbons having from about 5 to about 14 carbon atoms per molecule, and preferably a naphtha distillate having an end boiling point below about 200° F. With respect to the group of light hydrocarbons containing from about 3 to about 7 carbon atoms per molecule, preferred techniques dictate the utilization of a mixture thereof. For example, suitable solvent mixtures will comprise normal butane and isopentane, propane and normal butane, normal butane and normal pentane, for example.

The asphaltic residual feed stream is introduced into an extraction zone in a downwardly direction and therein contacts an upwardly flowing solvent stream. A solvent-lean asphaltic stream is withdrawn from the extraction zone at a location in the lower portion thereof. A solvent solution containing a solvent, demetallized oil and resin is removed from an upper location in the extraction zone. This resulting solvent solution is the feedstock which is introduced into the heat exchange apparatus utilized in the present invention.

In accordance with the present invention, a solvent solution containing a solvent, demetallized oil and resin is introduced into an upper region of a heat-exchange apparatus and directed downward over a portion of a generally vertically positioned heat-exchange surface thereby heating the solvent solution to precipitate a resin phase. After the downwardly flowing stream is heated to precipitate a resin phase, the flow of the solvent solution having a reduced concentration of resin is reversed by a baffle to an upward direction and the solvent solution is recovered from the heat-exchange apparatus. The precipitated resin phase is recovered from a lower region of the heat-exchange apparatus. By means of the heat exchange apparatus of the present invention, finely divided resin phase is able to be recovered rather than continue to be entrained in the flowing solvent solution.

The heat-exchange apparatus of the present invention utilizes the advantage of resin forming a separate phase on the hottest surface (upper heat-exchange surfaces) then flowing down the walls of the heat-exchange surfaces to a low velocity, continuous phase region of the vessel before dripping from the bottoms of the heat exchange surfaces, and the separation of at least some of the entrained resins by the sudden reversal of the continuous phase flow direction.

In accordance with the present invention, the heat exchange surfaces are preferably U-shaped, circular cross-sectioned tubes made from conventional metals such as, for example, steel, and may be designed and made by conventional methods known to those skilled in the design of heat exchangers. The outer surfaces of the heat exchange tubes (those directly contacting the solvent solution) are preferably smooth, as opposed to having baffles or other enhanced surfaces in order to encourage the unimpeded flow of the resin phase down the tubes and into the pool of resin in the lower portion of the heat-exchanger vessel. In a preferred embodiment of the present invention, the length of the tube bundle is from about 15 feet to about 50 feet, and the quantity of tubes in a bundle is determined by the amount of heat transfer required in a particular application. The effective length of the flow directing baffles is approximately 90% of the average length of the tube bundle. The baffle which forms an annulus with the shell of the heat-exchanger serves primarily to reverse the direction of flow of the solvent solution and may be located in any convenient configuration in accordance with the teachings herein, and it is contemplated that the solvent solution flow through the annulus will have a velocity somewhat greater than that during the downward flow, since the separation will have been accomplished before and during flow reversal. This higher velocity will be limited by the desire to avoid the generation of excessive turbulence while permitting an overall economical design of the apparatus.

The heat-exchange medium which is utilized to transfer heat to the solvent solution containing a solvent, demetallized oil and resin may be any suitable hot fluid but is preferably the solvent which is used in the overall process. The heating medium is preferably introduced at a temperature from about 300° F. (149° C.) to about 450° F. (232° C.).

In accordance with the present invention, preferred operating conditions include a resin precipitation temperature from about 200° F. (93° C.) to about 390° F. (200° C.) and pressure from about 500 psig (3447 kPa gauge) to about 640 psig (4413 kPa gauge), and an average linear velocity of the flowing solvent solution containing demetallized oil from about 1 cm/second to about 10 cm/second. The operating conditions will vary with the characteristics of the feed, the selected solvent, the desired characteristics of the demetallized oil and the actual configuration of the apparatus, and will be readily selected to achieve the desired results by an artisan while using the disclosure herein.

ILLUSTRATIVE EMBODIMENT

In a commercially designed process unit of 15,000 barrels per day capacity, the apparatus for separating a resin phase from a solvent solution containing a solvent, demetallized oil and resin, a vertical cylindrical outer vessel is employed having a diameter of 3.8 meters and a length or height of 17 meters. The solvent solution inlet pipe diameter is 41 cm and solvent solution outlet pipe diameter is 41 cm. The resin phase outlet pipe diameter is 41 cm. The heating medium inlet and outlet pipe diameter is 41 cm. The heat exchange tubes located within the outer vessel have an average length of 6 meters and have a combined heat exchange surface of 3000 m². The effective length of the flow directing baffle is approximately 90% of the average length of the heat exchange tubes. The average linear velocity around the heat exchange tubes is about 5 cm/sec.

The solvent solution containing a solvent, demetallized oil and resin is introduced into the heat-exchanger at a temperature from about 225° F. (107° C.) to about 289° F. (143° C.) and a pressure from about 550 psig (3792 kPa gauge) to about 600 psig (4137 kPa gauge). This solvent solution is heated to increase the temperature thereof by about 70° F. (21° C.) to about 90° F. (32° C.).

A solvent solution containing solvent and demetallized oil is recovered for the subsequent recovery of the solvent for recycle and demetallized oil for use elsewhere.

A resin stream in an amount of 8 liquid volume percent of the feed is recovered from the apparatus.

What is claimed is:

1. A heat-exchange apparatus for separating a resin phase from a solvent solution containing a solvent, demetallized oil and resin which comprises:

(a) at least one generally vertically positioned heat-exchange surface;
    (b) a means for directing the flow of said solvent solution in a downward direction over a portion of said heat-exchange surface thereby heating said solvent solution to precipitate a resin phase wherein said means is a baffle having a length of about 90% of the average length of said generally vertically positioned heat-exchange surface and forming an annulus within said apparatus to reverse the direction of fluid flow;
    (c) an outlet means to recover a solvent solution having a reduced concentration of resin which outlet means is located to essentially reverse the flow of said solvent solution having a reduced concentration of resin to a generally upward direction before exiting said heat-exchange apparatus; and
    (d) an outlet means to recover said resin phase from a lower portion of said heat-exchange apparatus.

2. The heat-exchange apparatus of claim 1 wherein said heat-exchange surface comprises U-shaped, circular cross-sectioned tubes.

3. The heat-exchange apparatus of claim 2 wherein said tubes are made from steel.

4. The heat-exchange apparatus of claim 2 wherein the outer surface of said tubes is smooth.

5. The heat-exchange apparatus of claim 2 wherein said tubes are bundled in length from about 15 to about 50 feet.

* * * * *